United States Patent
Kim

(10) Patent No.: US 10,233,314 B2
(45) Date of Patent: Mar. 19, 2019

(54) HIGH THERMAL RESISTANCE SYNTHETIC RUBBER AND HIGH SPECIFIC GRAVITY COMPOUND FOR WHEEL BALANCE WEIGHT USING THE SAME

(71) Applicant: Hyundai Motor Company, Seoul (KR)

(72) Inventor: Hyung-Seok Kim, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 68 days.

(21) Appl. No.: 15/385,567

(22) Filed: Dec. 20, 2016

(65) Prior Publication Data
US 2018/0072875 A1    Mar. 15, 2018

(30) Foreign Application Priority Data
Sep. 13, 2016 (KR) .................. 10-2016-0117890

(51) Int. Cl.
C08L 13/00    (2006.01)
C08L 27/14    (2006.01)
F16F 15/32    (2006.01)

(52) U.S. Cl.
CPC ............. *C08L 13/00* (2013.01); *C08L 27/14* (2013.01); *F16F 15/324* (2013.01); *C08L 2201/08* (2013.01); *F16F 2224/025* (2013.01); *F16F 2226/04* (2013.01)

(58) Field of Classification Search
CPC .......... C08L 13/00; C08L 27/14; F16F 15/324
USPC ......................................... 524/439; 428/323
See application file for complete search history.

(56) References Cited

U.S. PATENT DOCUMENTS

| 6,001,932 A | * | 12/1999 | Saito | ............... | C08F 212/14 |
| | | | | | 525/194 |
| 2006/0223927 A1 | * | 10/2006 | Hodjat | ............ | C08K 5/057 |
| | | | | | 524/405 |
| 2010/0255233 A1 | * | 10/2010 | Wakana | ............ | C08K 3/08 |
| | | | | | 428/35.7 |

FOREIGN PATENT DOCUMENTS

| JP | 7-286083 A | 10/1995 |
| JP | 2002-105324 A | 4/2002 |
| JP | 2004-43700 A | 2/2004 |
| KR | 10-2014-0073299 A | 6/2014 |
| KR | 10-1498263 B1 | 3/2015 |
| KR | 10-2015-0086526 A | 7/2015 |
| WO | WO 2015/067660 A1 | 5/2015 |

* cited by examiner

*Primary Examiner* — Deve E Valdez
(74) *Attorney, Agent, or Firm* — Morgan, Lewis & Bockius LLP

(57) ABSTRACT

The present invention relates to high thermal resistance synthetic rubber and a compound for a wheel balance weight using the same. In some aspects, the high specific gravity compound for the wheel balance weight has excellent curve adhesive strength and is capable of being cut and used as needed. Provided herein is a method of forming a high thermal resistance elastic body synthetic rubber. The method includes blending acrylic rubber and fluoro rubber. A wheel balance weight having a high specific gravity elastic body can be formed by using the high thermal resistance synthetic rubber described herein as a base polymer and a metal powder.

17 Claims, 1 Drawing Sheet

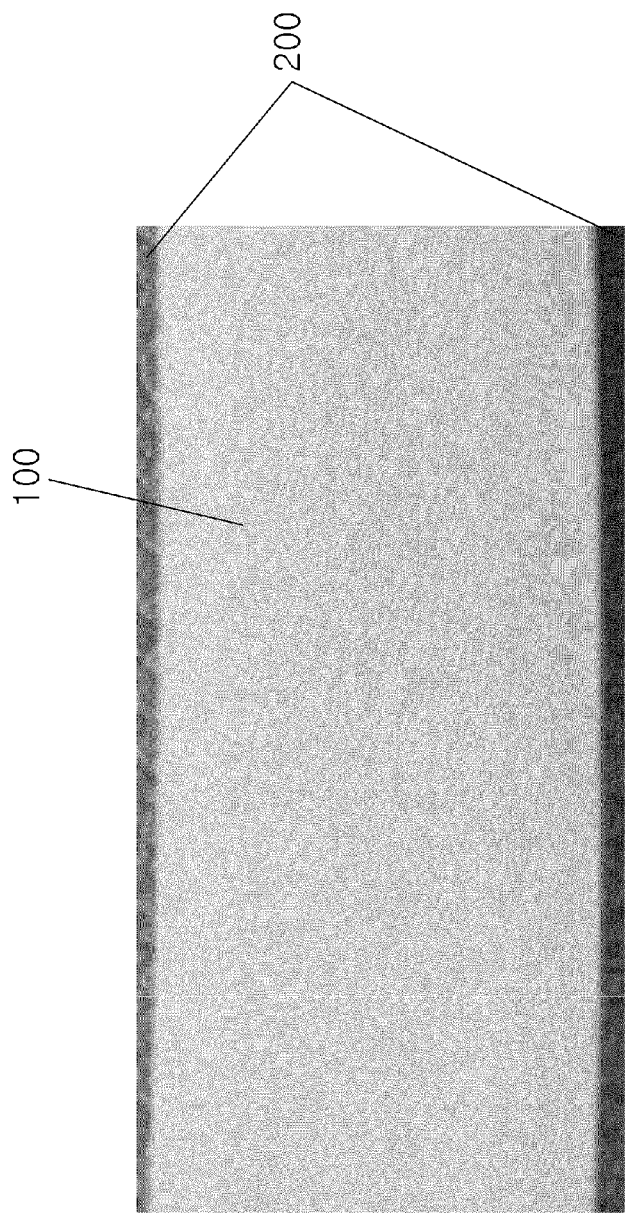

HIGH THERMAL RESISTANCE SYNTHETIC RUBBER AND HIGH SPECIFIC GRAVITY COMPOUND FOR WHEEL BALANCE WEIGHT USING THE SAME

CROSS-REFERENCE(S) TO RELATED APPLICATIONS

This application claims under 35 U.S.C. § 119(a) the benefit of Korean Patent Application No. 10-2016-0117890, filed on Sep. 13, 2016, the entire contents of which is incorporated herein by reference for all purposes.

BACKGROUND OF THE INVENTION

Field of the Invention

Exemplary embodiments of the present invention relate to high thermal resistance synthetic rubber and a compound for a wheel balance weight using the same. Also provided herein is a high specific gravity compound that can be used for a wheel balance weight having excellent curve adhesive strength of a wheel and capable of being cut and used as necessary. In one aspect of the present invention, a high thermal resistance elastic body synthetic rubber can be formed through blending acrylic rubber and fluoro rubber. In another aspect, high specific gravity elastic body can be formed by employing the synthetic rubber as a base polymer and using a metal powder as a filler.

Description of the Related Art

An automotive wheel is a component forming a wheel frame, and rotates at a high speed when an automobile is running. When weight distribution imbalance occurs in such an automotive wheel, wheel life, fuel efficiency and safety are seriously affected such that vibrations and noises are generated due to centrifugal force, tire abrasion and fuel consumption are intensified, and handle vibrations are generated.

Accordingly, in order to prevent such problems, a spot at which the weight is concentrated around the wheel is located, and on the opposite side thereof, a wheel balance weight having a certain weight is attached to maintain a weight balance of the wheel.

As such, the balance weight needs to be bent to be used so as to cope with the attached surface of the wheel, and as necessary, some of the balance weight needs to be cut in order to adjust the weight of the balance weight.

Lead (Pb) has been mainly used in the art as a material of the wheel balance weight. Lead is a soft material and has an advantage of being readily processed and bent, however, the use has been recently banned since it is very harmful to the body.

Accordingly, other metal materials have been used recently instead of lead, and zinc is plated on a cold rolled steel sheet and a foam tape is attached and adhered thereto to be used.

However, in this case, flexibility decreases due to the use of a steel sheet causing space between the wheel and the adhered surface. Also when used for a long period of time, the balance weight can separate and cause tire vibrations. Forming such wheel balance weight by automation is impossible since the steel sheet cannot be cut.

In addition, zinc plating which is used for preventing corrosion may be removed. Another disadvantage of this material is that the minimum weight is 5 g. This prevents a high degree of precision of the balance.

SUMMARY OF THE INVENTION

The present invention has been made in view of the above, and an object of the present invention is to provide high thermal resistance synthetic rubber with high specific gravity in which a crosslinking agent is not required by forming synthetic rubber having acrylic rubber and fluoro rubber mutually vulcanized and blended.

Another object of the present invention is to provide a high specific gravity compound for a wheel balance weight having excellent curve adhesive strength of a wheel and capable of being cut and used as necessary by adding stainless steel (SUS) powder to the synthetic rubber.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

High thermal resistance synthetic rubber according to one embodiment of the present invention has from about 0.3 parts per hundred rubber (phr) to 99.7 phr (e.g., about 0.3 phr, 0.4. 0.5, 0.6, 0.7, 0.8, 0.9, 1, 1.5, 2, 2.5, 3, 3, 5, 4, 4.5, 5, 5.5, 6, 6.5, 7, 7.5, 8, 8.5, 9, 9.5, 10. 1.50, 11, 12, 13, 14, 15, 16, 17, 18, 19, 20, 20.5, 21, 22, 23, 24, 25, 26, 27, 28, 29, 30, 30.5, 31, 32, 33, 34, 35, 36, 37, 38, 39, 40, 40.5, 41, 42, 43, 44, 45, 46, 47, 48, 49, 50, 50.5, 51, 52, 53, 54, 55, 56, 57, 58, 59, 60, 60.5, 61, 62, 63, 64, 65, 66, 67, 68, 69, 70, 70.5, 71, 72, 73, 74, 75, 76, 77, 78, 79, 80, 80.5, 81, 82, 83, 84, 85, 86, 87, 88, 89, 90, 90.1, 90.2, 90.3, 90.4, 90.5, 90.6, 90.7, 90.8, 90.9, 91, 91.1, 91.2, 91.3, 91.4, 91.5, 91.6, 91.7, 91.8, 91.9, 92, 92.1, 92.2, 92.3, 92.4, 92.5, 92.6, 92.7, 92.8, 92.9, 93, 93.1, 93.2, 93.3, 93.4, 93.5, 93.6, 93.7, 93.8, 93.9, 94, 94.1, 94.2, 94.3, 94.4, 94.5, 94.6, 94.7, 94.8, 94.9, 95, 95.1, 95.2, 95.3, 95.4, 95.5, 95.6, 95.7, 95.8, 95.9, 96, 96.1, 96.2, 96.3, 96.4, 96.5, 96.6, 96.7, 96.8, 96.9, 97, 97.1, 97.2, 97.3, 97.4, 97.5, 97.6, 97.7, 97.8, 97.9, 98, 98.1, 98.2, 98.3, 98.4, 98.5, 98.6, 98.7, 98.8, 98.9, 99, 99.1, 99.2, 99.3, 99.4, 99.5, 99.6, or about 99.7 phr) of fluoro rubber and from about 99.7 phr to 0.3 phr (e.g., 99.7, 99.5, 99.3, 99.1, 99, 98.9, 98.7, 98.5, 98.4, 98.3, 98.1, 97.9, 97.7, 97.5, 97.3, 97.1, 97, 96.9, 96.7, 96.5, 96.3, 96.1, 96, 95.9, 95.7, 95.5, 95.3, 95.1, 95, 94.5, 94, 93.5, 93, 92.5, 92, 91.5, 91, 90.5, 90, 89.5, 89, 88.5 88, 87.5, 87, 86.5, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 29, 48, 47, 46, 45, 44, 43, 42, 41, 42, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, or about 0.3 phr) of acrylic rubber directly mutually vulcanized and blended.

In some embodiments, the fluoro rubber is a polymer of 6-fluorinated propylene or a copolymer of the 6-fluorinated propylene and one or more monomers selected from the group consisting of fluorinated vinylidene and 4-fluorinated ethylene.

In some embodiments, the fluoro rubber comprises the 6-fluorinated propylene in from about 50 phr to 100 phr (e.g., about 50 phr, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or about 100 phr.

In some embodiments, the fluoro rubber further comprises from about 20 mol % to 40 mol % (e.g., about 20 mol %, 21, 22, 23, 24, 25, 26, 27, 28, 29, 30, 31, 32, 33, 34, 35, 36, 37, 38, 39, or about 40%) of a vinyl monomer.

In some embodiments, the acrylic rubber can comprise acrylic acid ester and further comprise a copolymerizable monomer comprising at least one crosslinking component selected from a crosslinking hydroxyl group and a crosslinking chlorine atom.

In some embodiments, the acrylic rubber further comprises a vinyl monomer copolymerizable with the acrylic acid ester.

A high specific gravity compound for a wheel balance weight according to another embodiment of the present invention can comprise the high thermal resistance synthetic rubber described herein as a base, and is formed by filling the synthetic rubber with a metal powder. In some embodiments, the high specific gravity compound or the wheel balance weight comprising this compound is extrusion molded.

In some embodiments, the high thermal resistance synthetic rubber has from about 0.3 phr to about 99.7 phr (e.g., about 0.3 phr, 0.4. 0.5, 0.6, 0.7, 0.8, 0.9, 1, 1.5, 2, 2.5, 3, 3, 5, 4, 4.5, 5, 5.5, 6, 6.5, 7, 7.5, 8, 8.5, 9, 9.5, 10. 1.50, 11, 12, 13, 14, 15, 16, 17, 18, 19, 20, 20.5, 21, 22, 23, 24, 25, 26, 27, 28, 29, 30, 30.5, 31, 32, 33, 34, 35, 36, 37, 38, 39, 40, 40.5, 41, 42, 43, 44, 45, 46, 47, 48, 49, 50, 50.5, 51, 52, 53, 54, 55, 56, 57, 58, 59, 60, 60.5, 61, 62, 63, 64, 65, 66, 67, 68, 69, 70, 70.5, 71, 72, 73, 74, 75, 76, 77, 78, 79, 80, 80.5, 81, 82, 83, 84, 85, 86, 87, 88, 89, 90, 90.1, 90.2, 90.3, 90.4, 90.5, 90.6, 90.7, 90.8, 90.9, 91, 91.1, 91.2, 91.3, 91.4, 91.5, 91.6, 91.7, 91.8, 91.9, 92, 92.1, 92.2, 92.3, 92.4, 92.5, 92.6, 92.7, 92.8, 92.9, 93, 93.1, 93.2, 93.3, 93.4, 93.5, 93.6, 93.7, 93.8, 93.9, 94, 94.1, 94.2, 94.3, 94.4, 94.5, 94.6, 94.7, 94.8, 94.9, 95, 95.1, 95.2, 95.3, 95.4, 95.5, 95.6, 95.7, 95.8, 95.9, 96, 96.1, 96.2, 96.3, 96.4, 96.5, 96.6, 96.7, 96.8, 96.9, 97, 97.1, 97.2, 97.3, 97.4, 97.5, 97.6, 97.7, 97.8, 97.9, 98, 98.1, 98.2, 98.3, 98.4, 98.5, 98.6, 98.7, 98.8, 98.9, 99, 99.1, 99.2, 99.3, 99.4, 99.5, 99.6, or about 99.7 phr of fluoro rubber, and from about 99.7 phr to 0.3 phr (e.g., 99.7, 99.5, 99.3, 99.1, 99, 98.9, 98.7, 98.5, 98.4, 98.3, 98.1, 98, 97.9, 97.7, 97.5, 97.3, 97.1, 97, 96.9, 96.7, 96.5, 96.3, 96.1, 96, 95.9, 95.7, 95.5, 95.3, 95.1, 95, 94.5, 94, 93.5, 93, 92.5, 92, 91.5, 91, 90.5, 90, 89.5, 89, 88.5 88, 87.5, 87, 86.5, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 29, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, or about 0.3 phr) of acrylic rubber directly mutually vulcanized and blended. In other words, the fluoror rubber and acrylic rubber are directly mutually vulcanized and blended to produce the high thermal resistance synthetic rubber.

The metal powder can be a stainless steel powder for enhancing corrosion resistance.

In some embodiments, the stainless steel powder is a sphere-shaped powder prepared using a water jet or gas jet method.

In some embodiments, the stainless steel powder may include stainless steel powder having different particle sizes. In some cases, the stainless steel powder has particle sizes of 45 μm to 120 μm (e.g., about 45 μm, 50, 60, 70, 80, 90, 100, 110, or about 120 μm) and is included in excess.

In some embodiments, the content of the stainless steel powder in the high specific gravity compound is from greater than about 350 phr and less than about 1500 phr (e.g., about 350 phr, 400, 450, 500, 550, 600, 650, 700, 750, 800, 850, 900, 950, 1000, 1050, 1100, 1150, 1200, 1250, 1300, 1350, 1400, 1425, 1450, 1451, 1452, 1453, 1454, 1455, 1456, 1457, 1458, 1459, or less than about 1500 phr).

In some embodiments, the fluoro rubber is a polymer of 6-fluorinated propylene or a copolymer of the 6-fluorinated propylene and one or more monomers selected from the group consisting of fluorinated vinylidene and 4-fluorinated ethylene.

In some embodiments, the 6-fluorinated propylene of the fluoro rubber is in 50 phr to 100 phr.

In some embodiments, he fluoro rubber also comprises from about 20 mol % to 40 mol % (e.g., about 20 mol %, 21, 22, 23, 24, 25, 26, 27, 28, 29, 30, 31, 32, 33, 34, 35, 36, 37, 38, 39 or about 40%) of a vinyl monomer.

In some instances, the acrylic rubber comprises acrylic acid ester and in certain cases, also includes a copolymerizable monomer comprising at least one crosslinking component selected from a crosslinking hydroxyl group and a crosslinking chlorine atom.

In some embodiments, the acrylic rubber also comprises a vinyl monomer copolymerizable with the acrylic acid ester.

In some embodiments, the compound has a specific gravity of from about 5 or higher (e.g., about 5, 6, 7, 8, 9 10, or more).

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings.

FIG. 1 is a wheel balance weight using a high specific gravity compound according to an embodiment of the present invention, which is continuously produced.

DESCRIPTION OF SPECIFIC EMBODIMENTS

Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way. Accordingly, embodiments described in the specification and constitutions illustrated in the drawings are merely most preferred embodiments of the present invention, and do not represent all technological ideas of the present invention, and therefore, possible presence of various equivalents and modified examples capable of replacing these at the time of application of the present invention needs to be understood. In addition, detailed descriptions on known functions and constitutions that may unnecessarily evade the gist of the present invention are not included. Hereinafter, preferred embodiments of the present invention will be described in detail with reference to attached drawings.

FIG. 1 shows a, wheel balance weight 100 (on the table 200) using a high specific gravity compound according to an embodiment of the present invention, which is continuously produced.

High thermal resistance synthetic rubber according to one embodiment of the present invention has from about 0.3 parts per hundred rubber (phr) to 99.7 phr (e.g., about 0.3 phr, 0.4. 0.5, 0.6, 0.7, 0.8, 0.9, 1, 1.5, 2, 2.5, 3, 3, 5, 4, 4.5, 5, 5.5, 6, 6.5, 7, 7.5, 8, 8.5, 9, 9.5, 10. 10.5, 11, 12, 13, 14, 15, 16, 17, 18, 19, 20, 20.5, 21, 22, 23, 24, 25, 26, 27, 28, 29, 30, 30.5, 31, 32, 33, 34, 35, 36, 37, 38, 39, 40, 40.5, 41, 42, 43, 44, 45, 46, 47, 48, 49, 50, 50.5, 51, 52, 53, 54, 55, 56, 57, 58, 59, 60, 60.5, 61, 62, 63, 64, 65, 66, 67, 68, 69, 70, 70.5, 71, 72, 73, 74, 75, 76, 77, 78, 79, 80, 80.5, 81, 82, 83, 84, 85, 86, 87, 88, 89, 90, 90.1, 90.2, 90.3, 90.4, 90.5, 90.6, 90.7, 90.8, 90.9, 91, 91.1, 91.2, 91.3, 91.4, 91.5, 91.6, 91.7, 91.8, 91.9, 92, 92.1, 92.2, 92.3, 92.4, 92.5, 92.6, 92.7, 92.8, 92.9, 93, 93.1, 93.2, 93.3, 93.4, 93.5, 93.6, 93.7, 93.8, 93.9, 94, 94.1, 94.2, 94.3, 94.4, 94.5, 94.6, 94.7, 94.8, 94.9, 95, 95.1, 95.2, 95.3, 95.4, 95.5, 95.6, 95.7, 95.8, 95.9, 96, 96.1, 96.2, 96.3, 96.4, 96.5, 96.6, 96.7, 96.8, 96.9, 97, 97.1, 97.2, 97.3, 97.4, 97.5, 97.6, 97.7, 97.8, 97.9, 98, 98.1, 98.2, 98.3, 98.4, 98.5, 98.6, 98.7, 98.8, 98.9, 99, 99.1, 99.2, 99.3, 99.4, 99.5, 99.6, or about 99.7 phr) of fluoro rubber and 99.7 phr to 0.3 phr (e.g., 99.7, 99.5, 99.3, 99.1, 99, 98.9, 98.7, 98.5, 98.4, 98.3, 98.1, 97.9, 97.7, 97.5, 97.3, 97.1, 97, 96.9, 96.7, 96.5, 96.3, 96.1, 96, 95.9, 95.7, 95.5, 95.3, 95.1, 95, 94.5, 94, 93.5, 93, 92.5, 92, 91.5, 91, 90.5, 90, 89.5, 89, 88.5 88, 87.5, 87, 86.5, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 29, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, or about 0.3 phr) of acrylic rubber directly mutually vulcanized and blended.

Typically, a crosslinking agent is added for crosslinking a rubber polymer. Fluoro rubber generally causes a crosslinking reaction using peroxide or phenol, and acrylic rubber causes a crosslinking reaction using sulfur (S). Therefore, mechanism of the crosslinking reaction of the two rubber is complex, and a stable dispersed state is difficult to maintain.

High thermal resistance synthetic rubber according to one embodiment of the present invention forms a stable polymer blend by mutually vulcanizing the fluoro rubber and the acrylic rubber without adding a separate vulcanizing agent.

The fluoro rubber has a disadvantage of being expensive, but has high specific gravity and excellent thermal resistance, and therefore, is advantageous in preparing a high specific gravity elastic body.

The composition is normally equivalent to those commercially available as a generic name of fluoro rubber, and more specifically, may be a single polymer of 6-fluorinated propylene. Alternatively, the composition of the present invention may include a copolymer of 6-fluorinated propylene and fluorinated vinylidene, or a 3-membered copolymer of 6-fluorinated propylene, fluorinated vinylidene and 4-fluorinated ethylene.

Herein, a crosslinking group capable of binding to a crosslinking point of the acrylic rubber is a fluorine atom produced by the copolymerization of the 6-fluorinated propylene. In certain embodiments, a preferable content ratio of the 6-fluorinated propylene in the fluoro rubber is from about 5 phr to about 100 phr (e.g., about 5, 6, 7, 8, 9, 10, 13, 15, 17, 19, 20, 25, 30, 35, 40, 45, 50, 55, 60, 65, 70, 75, 80, 85, 86, 87, 88, 89, 90, 91, 92, 93, 94, 95, 96, 97 98, 99, or about 100 phr), and particularly, from about 50 phr to 100 phr is preferable (e.g., about 5, 6, 7, 8, 9, 10, 13, 15, 17, 19, 20, 25, 30, 35, 40, 45, 50, 55, 60, 65, 70, 75, 80, 85, 86, 87, 88, 89, 90, 91, 92, 93, 94, 95, 96, 97 98, 99, or about 100 phr).

In some embodiments, the fluoro rubber may further include a vinyl monomer copolymerizable with the 6-fluorinated propylene in 20 mol % to 40 mol % (e.g., about 20 mol %, 21, 22, 23, 24, 25, 26, 27, 28, 29, 30, 31, 32, 33, 34, 35, 36, 37, 38, 39, or about 40%).

The vinyl monomer may be selected from among ethylene, propylene, methyl vinyl ether, ethyl vinyl ether, butyl vinyl ether and phenyl vinyl ether, but is not limited thereto.

In forming a high specific gravity compound for a wheel balance weight according to another embodiment of the present invention, the vinyl monomer is included for preventing mechanical property decline caused by the addition of stainless steel (SUS) powder to be described below.

The acrylic rubber has excellent thermal resistance, oil resistance and weather resistance, and therefore, is highly utilized as rubber components for automobiles.

Herein, the acrylic rubber includes acrylic acid ester as a main component, and may further include a copolymerizable monomer having a crosslinking hydroxyl group or a crosslinking chlorine atom capable of becoming a crosslinking point with the fluoro rubber.

The acrylic acid ester may be selected from acrylic acid alkyl ester such as methyl acrylate, ethyl acrylate, propyl acrylate, isopropyl acrylate, n-butyl acrylate, isobutyl acrylate and octyl acrylate, or acrylic acid alkoxy alkyl ester such as 2-methoxyethyl acrylate, 2-ethoxyethyl acrylate, 2-butoxyethyl acrylate and 3-methoxypropyl acrylate, but is not limited thereto.

The copolymerizable monomer can include a crosslinking hydroxyl group or a crosslinking chlorine atom.

The crosslinking hydroxyl group is preferably a phenolic hydroxyl group, and specifically, may use a monomer containing a crosslinking hydroxyl group such as o,m,p-hydroxystyrene, α-methyl-o-hydroxystyrene, vinyl salicylate, p-isopropenyl phenol, o,m,p-allyl phenol and 2,2-(o,m,p-hydroxyphenyl-4-vinylacetyl)propane, but is not limited thereto.

The crosslinking chlorine atom is preferably an active chlorine atom, and specifically, may use a monomer containing an active chlorine atom such as 2-chloroethylvinyl ether, monochlorovinyl acetate, chloromethylstyrene and allyl chloride, but is not limited thereto.

In some embodiments, the acrylic rubber may further include a vinyl monomer copolymerizable with acrylic acid ester as necessary.

Herein, the vinyl monomer may be selected from among acrylonitrile, vinyl acetate, styrene, methacrylic acid alkyl esters and methacrylic acid alkoxy alkyl esters, but is not limited thereto.

In forming a high specific gravity compound for a wheel balance weight according to another embodiment of the present invention, the vinyl monomer is included for preventing mechanical property (tensile strength) decline caused by the addition of stainless steel (SUS) powder to be described below.

As described above, the high thermal resistance synthetic rubber according to one embodiment of the present invention is capable of forming a low-priced non-vulcanized rubber composition with high thermal resistance and high specific gravity. Such high thermal resistance synthetic rubber can be produced by directly mutually vulcanizing fluoro rubber having a fluorine atom as a crosslinking group and acrylic rubber. The acrylic rubber can include a copolymerizable monomer comprising a crosslinking hydroxyl group or a crosslinking chlorine atom. The high thermal resistance synthetic rubber can be generated without adding a vulcanizing agent to the fluoro rubber and the acrylic rubber. In certain instances, subsidiary materials can be added to common rubber compounds together with a hydrolytic agent formed with metal oxides and metal hydroxides and a vulcanization accelerator formed with quaternary ammonium salts and/or quaternary phosphonium salts. Other subsidiary materials or additives include an antioxidant such as diphenylamine derivatives and phenylenediamine derivatives, a processing material such as stearic acid, a filler such as carbon black, kaolin clay, talc and diatomite, and a plasticizer.

The high specific gravity compound for a wheel balance weight according to another embodiment of the present invention is formed by employing high thermal resistance synthetic rubber prepared as described above as a base polymer, and filling the synthetic rubber with metal powder as a filler.

The high thermal resistance synthetic rubber used as the base polymer of the high specific gravity compound can be produced from about 0.3 phr to 99.7 phr (e.g., about 0.3 phr, 0.4. 0.5, 0.6, 0.7, 0.8, 0.9, 1, 1.5, 2, 2.5, 3, 3, 5, 4, 4.5, 5, 5.5, 6, 6.5, 7, 7.5, 8, 8.5, 9, 9.5, 10. 1.50, 11, 12, 13, 14, 15, 16, 17, 18, 19, 20, 20.5, 21, 22, 23, 24, 25, 26, 27, 28, 29, 30, 30.5, 31, 32, 33, 34, 35, 36, 37, 38, 39, 40, 40.5, 41, 42, 43, 44, 45, 46, 47, 48, 49, 50, 50.5, 51, 52, 53, 54, 55, 56, 57, 58, 59, 60, 60.5, 61, 62, 63, 64, 65, 66, 67, 68, 69, 70, 70.5, 71, 72, 73, 74, 75, 76, 77, 78, 79, 80, 80.5, 81, 82, 83, 84, 85, 86, 87, 88, 89, 90, 90.1, 90.2, 90.3, 90.4, 90.5, 90.6, 90.7, 90.8, 90.9, 91, 91.1, 91.2, 91.3, 91.4, 91.5, 91.6, 91.7, 91.8, 91.9, 92, 92.1, 92.2, 92.3, 92.4, 92.5, 92.6, 92.7, 92.8, 92.9, 93, 93.1, 93.2, 93.3, 93.4, 93.5, 93.6, 93.7, 93.8, 93.9, 94, 94.1, 94.2, 94.3, 94.4, 94.5, 94.6, 94.7, 94.8, 94.9, 95, 95.1, 95.2, 95.3, 95.4, 95.5, 95.6, 95.7, 95.8, 95.9, 96, 96.1, 96.2, 96.3, 96.4, 96.5, 96.6, 96.7, 96.8, 96.9, 97, 97.1, 97.2, 97.3, 97.4, 97.5, 97.6, 97.7, 97.8, 97.9, 98, 98.1, 98.2, 98.3, 98.4, 98.5, 98.6, 98.7, 98.8, 98.9, 99, 99.1, 99.2, 99.3, 99.4, 99.5, 99.6, or about 99.7 phr) of fluoro rubber and 99.7 phr to 0.3 phr (e.g., about 99.7 phr, 99.5, 99.3, 99.1, 99, 98.9, 98.7, 98.5, 98.4, 98.3, 98.1, 97.9, 97.7, 97.5, 97.3, 97.1, 97, 96.9, 96.7, 96.5, 96.3, 96.1, 96, 95.9, 95.7, 95.5, 95.3, 95.1, 95, 94.5, 94, 93.5, 93, 92.5, 92, 91.5, 91, 90.5, 90, 89.5, 89, 88.5 88, 87.5, 87, 86.5, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 29, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, or about 0.3 phr) of acrylic rubber that are mutually vulcanized and blended.

As described above, different vulcanizing agents are required for each crosslinking reaction of the fluoro rubber and the acrylic rubber. When different vulcanizing agents are used for the crosslinking reaction between the two rubber polymers, the crosslinking reaction of the two rubber polymers is complex, and a stable dispersed state is difficult to maintain.

The composition of the fluoro rubber forming the high thermal resistance synthetic rubber is substantially equivalent to commercially available or generically named fluoro rubber. In some embodiments, the fluoro rubber composition may be a single polymer of 6-fluorinated propylene. Alternatively, the composition may include a copolymer of 6-fluorinated propylene and fluorinated vinylidene, or a 3-membered copolymer of 6-fluorinated propylene, fluorinated vinylidene and 4-fluorinated ethylene.

In some instances, the crosslinking group capable of binding to a crosslinking point of the acrylic rubber is a fluorine atom produced by the copolymerization of the 6-fluorinated propylene. In some embodiments, a preferable or useful content ratio of the 6-fluorinated propylene in the fluoro rubber is from about 5 phr to 100 phr (e.g., about 5, 6, 7, 8, 9, 10, 13, 15, 17, 19, 20, 25, 30, 35, 40, 45, 50, 55, 60, 65, 70, 75, 80, 85, 86, 87, 88, 89, 90, 91, 92, 93, 94, 95, 96, 97 98, 99, or about 100 phr), and particularly, from about 50 phr to 100 phr (e.g., about 50, 55, 60, 65, 70, 75, 80, 85, 86, 87, 88, 89, 90, 91, 92, 93, 94, 95, 96, 97 98, 99, or about 100 phr) is preferable.

The composition of the acrylic rubber forming the high thermal resistance synthetic rubber can include acrylic acid ester as a main component, and may further include a copolymerizable monomer having a crosslinking hydroxyl group or a crosslinking chlorine atom capable of becoming a crosslinking point with the fluoro rubber.

The acrylic acid ester may be selected from acrylic acid alkyl ester such as methyl acrylate, ethyl acrylate, propyl acrylate, isopropyl acrylate, n-butyl acrylate, isobutyl acrylate and octyl acrylate, or acrylic acid alkoxy alkyl ester such as 2-methoxyethyl acrylate, 2-ethoxyethyl acrylate, 2-butoxyethyl acrylate and 3-methoxypropyl acrylate, but is not limited thereto.

The copolymerizable monomer may include a crosslinking hydroxyl group or a crosslinking chlorine atom.

The crosslinking hydroxyl group is preferably a phenolic hydroxyl group. In certain embodiments, it may be a monomer containing a crosslinking hydroxyl group such as o,m, p-hydroxystyrene, α-methyl-o-hydroxystyrene, vinyl salicylate, p-isopropenyl phenol, o,m,p-allyl phenol and 2,2-(o,m, p-hydroxyphenyl-4-vinylacetyl)propane, but is not limited thereto.

The crosslinking chlorine atom is preferably an active chlorine atom, and in some instances, may use a monomer containing an active chlorine atom such as 2-chloroethylvinyl ether, monochlorovinyl acetate, chloromethylstyrene and allyl chloride, but is not limited thereto.

The high specific gravity compound for a wheel balance weight according to another embodiment of the present invention can be formed by employing high thermal resistance synthetic rubber prepared as described above as a base polymer, and filling the synthetic rubber with metal powder as a filler.

The metal powder may include high specific gravity stainless steel (SUS) powder for enhancing specific gravity of the compound.

In some embodiments, stainless steel (SUS) may include one or more steel grades selected from among grades of SUS200 series, SUS300 series and SUS600 series having favorable corrosion resistance, and preferably, may be SUS (314).

Hereinafter, the term "SUS powder" is described.

The shape of the particles of the SUS powder may be both atypical and spherical. In some cases, spherical powder provides a smooth surface to the compound.

The SUS powder may be prepared using a water jet method or a gas jet method.

In order to form a high specific gravity compound, the SUS powder may combine SUS powder having three particle sizes. These particles may increase a filling factor.

The following Table 1 shows test data measuring filling density for the SUS powder of each particle size used as the filler.

When the high thermal resistance synthetic rubber was filled with a combination of SUS powder having particle sizes of from about 10 μm (micrometer) to 45 μm from about 45 μm to 120 μm, and from about 120 μm to 150 μm each, it was determined that high apparent density and tap density were obtained when the SUS powder particle were from about 45 μm to 120 μm and included in excess (e.g., 68% of total particles). In some cases, the term "in excess" includes from about 60% or more, e.g, about 60%, 61, 62, 63, 64, 65, 66, 67, 68, 69, 70, 71, 72, 73, 74, 75, 76, 77, 78, 79, 80, 85, 90, about 95% or more.

TABLE 1

| | SUS Powder Particle Size | | |
|---|---|---|---|
| | 10 μm to 45 μm | 45 μm to 120 μm | 120 μm to 150 μm |
| Content of Each Particle Size | 29% | 68% | 3% |
| Tap density | 6.2 | 7.1 | 6.3 |
| Apparent density | 4.3 | 5.1 | 4.1 |

The following Table 2 is a table showing a composition ratio of the high specific gravity compound for a wheel balance weight according to another embodiment of the present invention.

As the mechanical property in the following Table 2, tensile strength was tested. For measuring cut maximum stress of the vulcanized rubber and elongation of the cut, as well as stress for specific elongation, the test piece included a JIS No. 2-type (dumbbell-shaped) specimen. The thickness employed was 2 mm. As the tester, a general tensile tester was used, and 500 mm±25 mm/min was employed.

In addition, specific gravity of the compound was measured using an electronic specific gravity measuring device, and specific gravity values were obtained by measuring the weight in the air and the weight in water after installing the sample on a specimen fixture and operating the specific gravity measuring device.

The thermal resistance in the following Table 2 was identified by measuring after aging the sample at 150° C. for 24 hours, and then measuring tensile strength.

The following composition ratios are composition ratios of only fluoro rubber, acrylic rubber and SUS powder, which are components of an exemplary embodiment of the compound of the present invention. As described above, a hydrolytic agent formed with metal oxides and metal hydroxides and a vulcanization accelerator formed with quaternary ammonium salts and/or quaternary phosphonium salts can be added to common polymerization processes of rubber. In some cases, subsidiary materials can be added to common rubber compounds. For instance, an antioxidant such as diphenylamine derivatives and phenylenediamine derivatives, a processing material such as stearic acid, a filler such as carbon black, kaolin clay, talc and diatomite, and a plasticizer can be added to assist the direct mutual crosslinking reaction of the fluoro rubber and the acrylic rubber. However, these are all known additives and common additives, and detailed descriptions thereon will not be included.

Example 1 to Example 5 and Comparative Example 1 to Comparative Example 5 of the following Table 2 were mixed with an open mill roll used in general rubber processes. Also, SUS powder was introduced while flowability was provided by mixing the rubber mixture in advance at a high temperature in a mixing process. Extrusion was visually identified. Thermal resistance test was carried out under a condition of 150° C., 24 hours, and the SUS powder was prepared to a spherical shape.

The SUS powder was used for providing high specific gravity and corrosion resistance. The mechanical property has a numerical range of 8.2 MPa when used in 350 phr as in Comparative Example 3, 4.0 MPa when used in 1500 phr as in Comparative Example 4, and 3.7 MPa when used in 1510 phr as in Comparative Example 5. It was identified that strength decreased as the content increased. However, when used in 350 phr, specific gravity became 3.96 as in Comparative Example 3, and target high specific gravity of the embodiments of the present invention was not able to be obtained. Accordingly, the SUS powder is preferably used in greater than about 350 phr and less than about 1500 phr.

However, in order to prevent mechanical property decline caused by the increase in the SUS powder content, a vinyl monomer is further included in each of the fluoro rubber and the acrylic rubber as described above to provide flowability to the compound. As a result, mechanical property decline caused by the increase in the SUS powder content may be prevented.

The fluoro rubber was used for obtaining high specific gravity and high thermal resistance, however, when using only the fluoro rubber in 100 phr as in Comparative Example 2, extrusion molding was not obtained leading to a problem of unfavorable processibility.

The acrylic rubber was used for obtaining high thermal resistance, however, when using only the acrylic rubber in 100 phr as in Comparative Example 1, it was identified that there was a problem in thermal resistance.

Accordingly, as in Example 1 to Example 5, it is preferable that 0.3 phr to 99.7 phr of the fluoro rubber and 99.7 phr to 0.3 phr of the acrylic rubber be mutually vulcanized and blended.

In addition, specific gravity of the high specific gravity compound for a wheel balance weight according to another embodiment of the present invention needs to be 5 or higher.

TABLE 2

| Category | Raw Material (phr) | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| Raw Material | Fluoro Rubber (phr) | 0.3 | 5 | 20 | 50 | 95 | 99.7 | 0 | 100 | 50 | 50 | 50 |
| | Acrylic Rubber (phr) | 99.7 | 95 | 80 | 50 | 5 | 0.3 | 100 | — | 50 | 50 | 50 |
| | SUS Powder (phr) | 1000 | 1000 | 1000 | 1000 | 1000 | 1000 | 1000 | 1000 | 350 | 1500 | 1510 |
| Physical Property | Mechanical Property (MPa) | 6.2 | 6.2 | 6.1 | 6.0 | 5.9 | 5.9 | 6.3 | 5.7 | 8.2 | 4.0 | 3.7 |
| | Specific | 5.05 | 5.09 | 5.25 | 5.60 | 6.20 | 6.27 | 5.04 | 6.28 | 3.96 | 6.15 | 6.16 |

TABLE 2-continued

| Category | Raw Material (phr) | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| | Gravity Extrusion | Very Excellent | Excellent | Excellent | Excellent | Fair | Fair | Very Excellent | Impossible to Extrude | Excellent | Poor | Impossible to Extrude |
| | Thermal Resistance (150° C., 24 h) | Fair | Fair | Excellent | Very Excellent | Very Excellent | Very Excellent | Poor | Very Excellent | Very Excellent | Very Excellent | Impossible to Evaluate |

As described above, one embodiment of the present invention is a high thermal resistance synthetic rubber, which has an excellent bending property and is capable of being attached along the inner surface of a wheel without separation.

Another embodiment of the present invention is a high specific gravity compound useful for a wheel balance weight. This compound adds corrosion resistance to synthetic rubber of high specific gravity and high thermal resistance. The high specific gravity compound can be used in a decreased amount with respect to a metallic balance weight, and has corrosion resistance. As a result, the wheel balance weight comprising the high specific gravity compound has an enhanced merchantable quality since no corrosion occurs even after being attached on a vehicle for a long period of time.

In addition, the compound is extrusion molded to a roll type and therefore is capable of being cut and used in needed quantities. Thus, inventory costs are reduced and productivity of an attachment process is enhanced.

The present invention is effective in forming high thermal resistance synthetic rubber of high specific gravity by forming synthetic rubber having acrylic rubber and fluoro rubber mutually vulcanized and blended without adding a separate vulcanizing agent, and, by adding stainless steel (SUS) powder to this synthetic rubber. The high thermal resistance synthetic rubber of the present invention is effective as a high specific gravity compound for a wheel balance weight, provides excellent curve adhesive strength to a wheel, and can be cut and used as needed.

While the present invention has been described with respect to the specific embodiments, it will be apparent that the embodiments examined above are merely preferred embodiments provided for those having common knowledge in the art (hereinafter, referred to as 'those skilled in the art') to readily implement the present invention, and the present invention is not limited to the embodiments described above and the attached drawings, and therefore, the scope of the present invention is not limited thereby. Accordingly, it will be apparent to those skilled in the art that various substitutions, modifications and changes may be made without departing from technological ideas of the present invention, and parts that can be readily changed by those skilled in the art are also included in the scope of the present invention.

What is claimed is:

1. A thermal resistance synthetic rubber having from about 0.3 phr to 99.7 phr of fluoro rubber and from about 99.7 phr to 0.3 phr of acrylic rubber directly mutually vulcanized and blended,
    wherein the fluoro rubber is a polymer of 6-fluorinated propylene, or a copolymer of the 6-fluorinated propylene and one or more monomers selected from the group consisting of fluorinated vinylidene and 4-fluorinated ethylene, and
    wherein the 6-fluorinated propylene is in from about 50 phr to 100 phr.

2. A thermal resistance synthetic rubber having from about 0.3 phr to 99.7 phr of fluoro rubber and from about 99.7 phr to 0.3 phr of acrylic rubber directly mutually vulcanized and blended,
    wherein the fluoro rubber is a polymer of 6-fluorinated propylene, or a copolymer of the 6-fluorinated propylene and one or more monomers selected from the group consisting of fluorinated vinylidene and 4-fluorinated ethylene, and
    wherein the fluoro rubber further comprises from about 20 mol % to 40 mol % of a vinyl monomer.

3. The thermal resistance synthetic rubber of claim 2, wherein the acrylic rubber comprises acrylic acid ester, and further comprises a copolymerizable monomer comprising at least one crosslinking component selected from a crosslinking hydroxyl group and a crosslinking chlorine atom.

4. The thermal resistance synthetic rubber of claim 3, wherein the acrylic rubber further comprises a vinyl monomer copolymerizable with the acrylic acid ester.

5. The thermal resistance synthetic rubber of claim 1, wherein the acrylic rubber comprises acrylic acid ester, and further comprises a copolymerizable monomer comprising at least one crosslinking component selected from a crosslinking hydroxyl group and a crosslinking chlorine atom.

6. The thermal resistance synthetic rubber of claim 5, wherein the acrylic rubber further comprises a vinyl monomer copolymerizable with the acrylic acid ester.

7. A compound for a wheel balance weight employing a thermal resistance synthetic rubber as a base and a metal powder, wherein the wheel balance weight is formed by filling the synthetic rubber with metal powder,
    wherein the metal powder is stainless steel powder for enhancing corrosion resistance, and
    wherein content of the stainless steel powder is from about greater than 350 phr and from about less than 1500 phr.

8. The compound for a wheel balance weight of claim 7, wherein the high thermal resistance synthetic rubber has from about 0.3 phr to 99.7 phr of fluoro rubber and from about 99.7 phr to 0.3 phr of acrylic rubber directly mutually vulcanized and blended.

9. The compound for a wheel balance weight of claim 7, wherein the stainless steel powder comprises spherical-shaped powder particles prepared using a water jet or gas jet method.

10. The compound for a wheel balance weight of claim 7, wherein the stainless steel powder particles are of different particle sizes from about 45 μm to 120 μm and present in excess.

11. The compound for a wheel balance weight of claim 8, wherein the fluoro rubber is a polymer of 6-fluorinated propylene, or a copolymer of the 6-fluorinated propylene and one or more monomers selected from the group consisting of fluorinated vinylidene and 4-fluorinated ethylene.

12. The compound for a wheel balance weight of claim 11, wherein the fluoro rubber comprises the 6-fluorinated propylene in from about 50 phr to 100 phr.

13. The compound for a wheel balance weight of claim 11, wherein the fluoro rubber further comprises from about 20 mol % to 40 mol % of a vinyl monomer.

14. The compound for a wheel balance weight of claim 8, wherein the acrylic rubber comprises acrylic acid ester, and further comprises a copolymerizable monomer comprising at least one crosslinking component selected from a crosslinking hydroxyl group and a crosslinking chlorine atom.

15. The compound for a wheel balance weight of claim 14, wherein the acrylic rubber further comprises a vinyl monomer copolymerizable with the acrylic acid ester.

16. The compound for a wheel balance weight of claim 7, which has a specific gravity of from about 5 or higher.

17. The compound for a wheel balance weight of claim 7, wherein the wheel balance weight is extrusion molded.

* * * * *